June 21, 1966 P. G. ANNABLE ETAL 3,257,005
BLOCK STACKING APPARATUS
Original Filed July 19, 1962 8 Sheets-Sheet 1

INVENTORS
PAUL G. ANNABLE
WAYNE G. DASHER
BY
*Blair and Buehler*
ATTORNEYS

June 21, 1966  P. G. ANNABLE ETAL  3,257,005
BLOCK STACKING APPARATUS
Original Filed July 19, 1962  8 Sheets-Sheet 4

INVENTORS
PAUL G. ANNABLE
WAYNE G. DASHER
BY Blair and Buehler
ATTORNEYS June 21, 1966  P. G. ANNABLE ETAL  3,257,005
BLOCK STACKING APPARATUS
Original Filed July 19, 1962  8 Sheets-Sheet 8

INVENTORS
PAUL G. ANNABLE
WAYNE G. DASHER
BY Blair and Buehler
ATTORNEYS

United States Patent Office 3,257,005
Patented June 21, 1966

3,257,005
BLOCK STACKING APPARATUS
Paul G. Annable and Wayne G. Dasher, Danbury, Conn., assignors to Connecticut Research Associates, Inc., Danbury, Conn.
Original application July 19, 1962, Ser. No. 211,063. Divided and this application Dec. 20, 1963, Ser. No. 332,086
5 Claims. (Cl. 214—6)

The present invention concerns a method and apparatus for automatically stacking rectangular prisms or blocks in interlocking patterns to form a stack or "cube" which may be handled as a unit without having a tendency to fall apart. This application is a divisional application of our co-pending application Serial No. 211,063, filed July 19, 1962.

Known automatic block cubers used in industry, for example in cubing concrete blocks, do not produce a fully interlocking pattern wherein an entire layer of blocks is completely interlocked with the next higher layer. Accordingly, block stacks produced by these prior art automatic cubers tended to fall apart when handled, for example when being manipulated by a fork lift truck or during transport on a highway.

Fully interlocking patterns were previously produced manually by placing individual blocks one at a time on the cube. Since manual labor was involved, this method of producing interlocking stacks was expensive, as well as being slow and very fatiguing work.

Accordingly it is an object of the invention to provide a method for cubing blocks into interlocking stacks.

It is a further object of the invention to provide apparatus to perform the above method automatically.

It is a further object of the invention to provide apparatus of the above character for marshalling and forming modular groups of several individual blocks.

It is a further object of the invention to provide apparatus of the above character for assembling the modular groups into layers, whereby each layer completely interlocks the layer below.

It is a further object of the invention to provide apparatus of the above character which is simple and reliable and which affords great operating economies.

Other objects of the invention will in part be obvious and will in part appear hereinafter.

The invention accordingly comprises the several steps and relation of one or more said steps with respect to each of the others thereof, which will be exemplified in the method hereinafter disclosed, together with the features of construction, combinations of elements, and arrangement of parts which will be exemplified and the construction hereinafter set forth, and the scope of the various aspects of the invention will be indicated in the claims.

For a fuller understanding of the nature and objects of the invention, reference should be had to the following detailed description taken in connection with the accompanying drawings, in which FIGURE 6 is a perspective view of the pusher table assembly.

Figure 1:
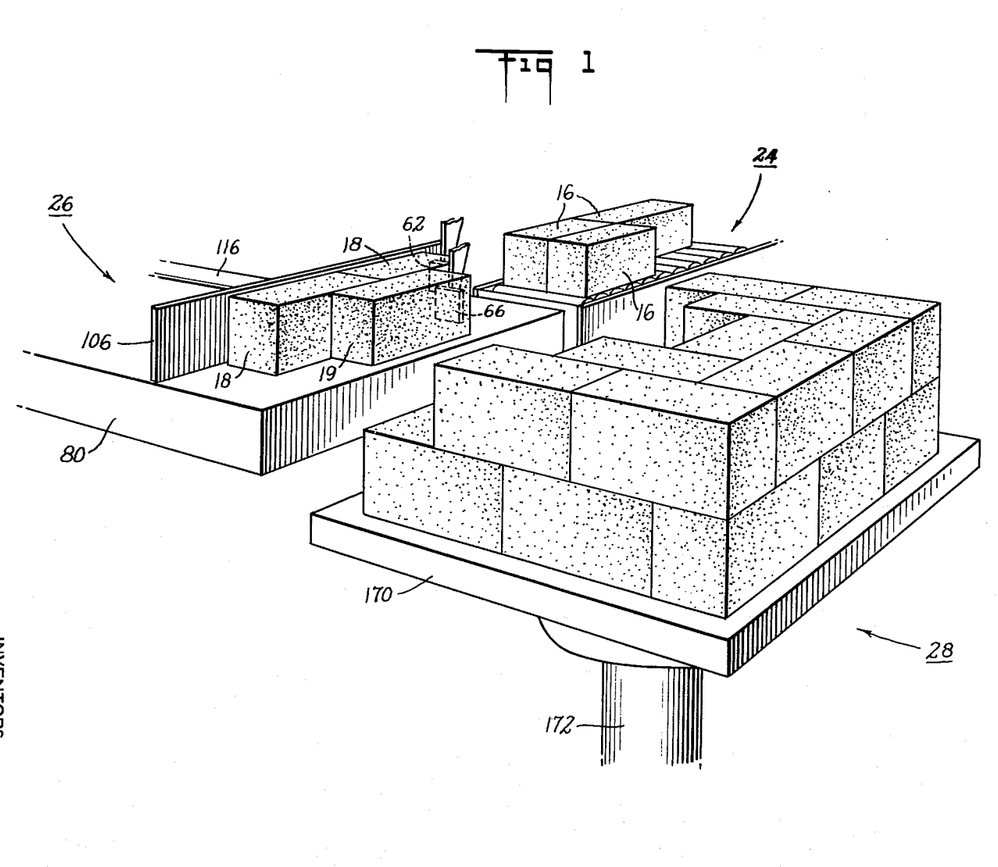
FIGURE 1 is a schematic perspective view of one embodiment of an automatic block cuber, illustrated as adapted to handle concrete blocks.

Referring now to FIGURE 1, a selected group of blocks 16 on a marshalling conveyor 24 are formed into pyramidal modules and placed on a finger table 26. In the illustrated embodiment, the pyramidal module consists of two base blocks 18 and an apex block 19, which is centered or aligned with the juncture between base blocks 18. Finger table 26 then places four such pyramidal modules sequentially on turntable 28, which rotates after receiving each module, thus forming a rectangular array as will be more fully explained below. After an array has thus been placed on turntable 28, one or more linear modules are added to form a complete layer, whereupon turntable 28 is lowered a distance corresponding to the thickness of one layer and the entire process is then repeated to build another layer on top of and interlocking the previous layer of blocks. The invention will be described with reference to 8" x 16" concrete blocks, although it is not limited thereto.

The closest interfitting of modules in each tier is achieved when the blocks are twice as long as they are wide.

*Module forming*

Figure 2:
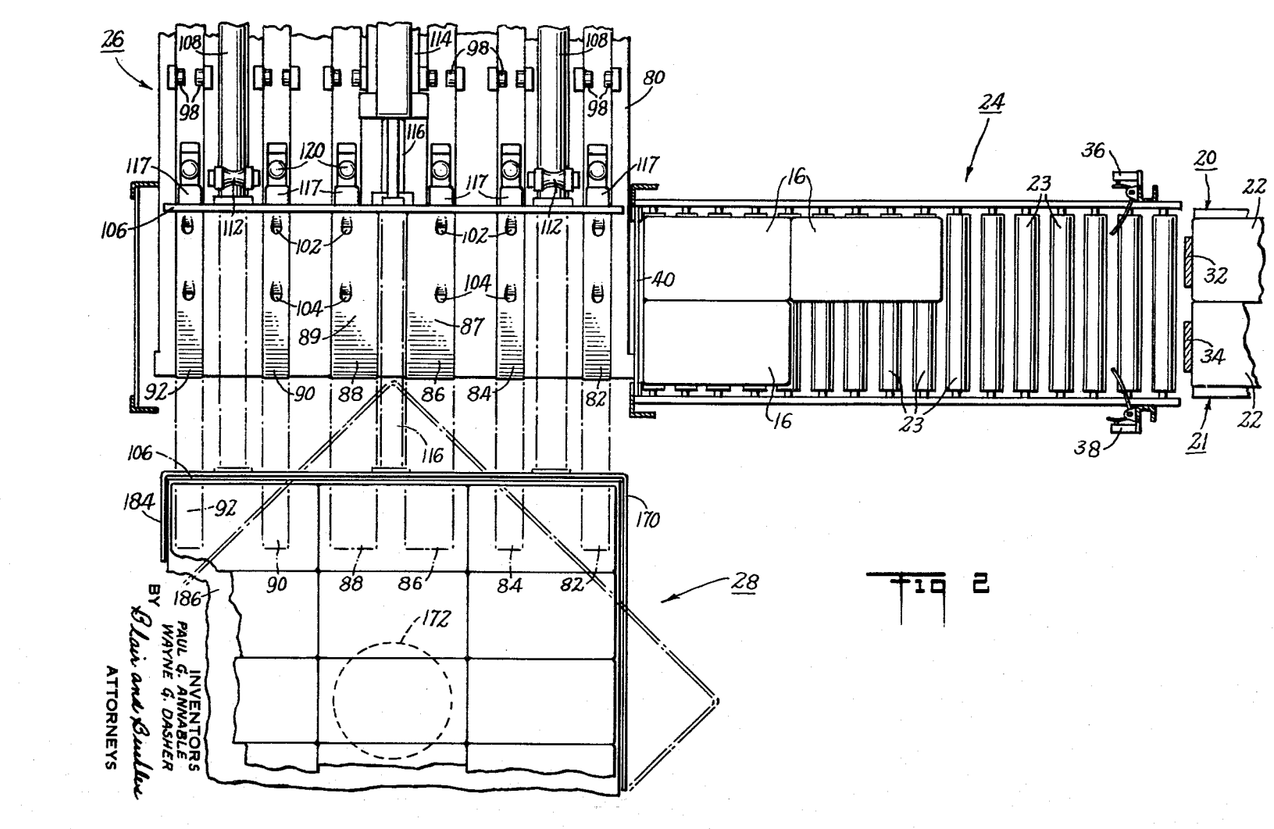
FIGURE 2 is a top plan view of the cuber shown in FIGURE 1.

Referring to FIGURE 2, a continuous supply of blocks 22 is maintained by each of conveyors 20 and 21. Blocks 22 are all positioned with their apertures parallel to the illustrated conveyor rolls 23, and have dimensions on their upper surfaces as viewed in FIGURE 1 of approximately 8" width x 16" length.

Figure 3:
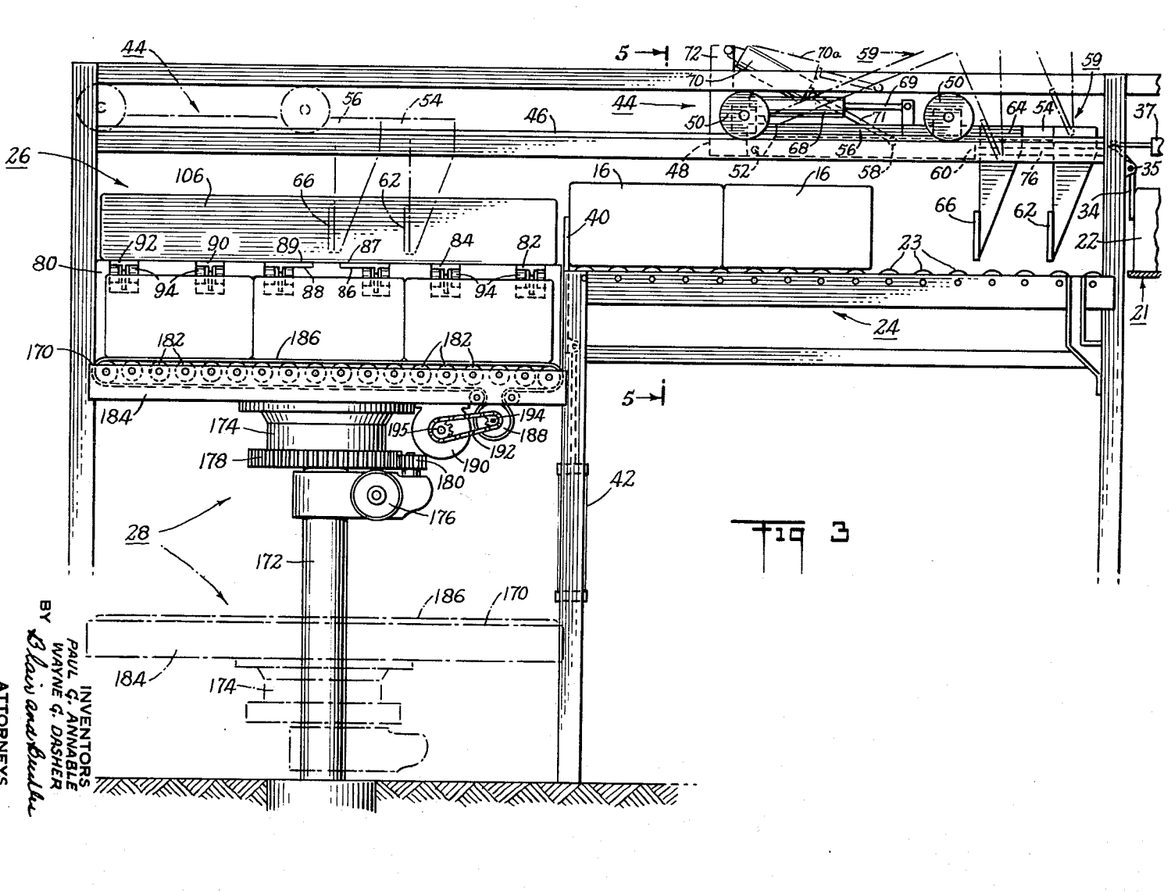
FIGURE 3 is a side elevation view of the apparatus illustrated in FIGURE 1.

A feed gate 32 is provided to selectively admit one or more blocks 22 from conveyor 20 to a marshalling conveyor 24, while the blocks on conveyor 21 are selectively fed to marshalling conveyor 24 by feed gate 34. As shown in FIGURE 3, gate 34 may be pivoted about a suitable shaft 35 and operated by a hydraulic cylinder 37. Gate 32 may be operated and mounted similarly to gate 34. Switches 36 and 38, mounted on the sides of conveyor 24, count the blocks fed into marshalling conveyor 24 from conveyors 20 and 21, respectively. After the proper numbers of blocks have been fed from each of conveyors 20 and 21, switches 36 and 38 initiate signals resulting in closure of gates 32 and 34 respectively. The blocks 16 thus fed into marshalling conveyor 24 are driven to the left end thereof as viewed in FIGURE 2, where they are stopped by a vertical sliding gate 40 (see FIGURE 3), operated by a vertically mounted hydraulic cylinder 42. Preferably, conveyor 24 drives the blocks at a higher speed than conveyors 20 and 21, whereby the blocks 16 are separated from blocks 22 as they pass gates 32 and 34, thus permitting gates 32 and 34 to pivot down and stop unwanted blocks 22.

Figure 4:
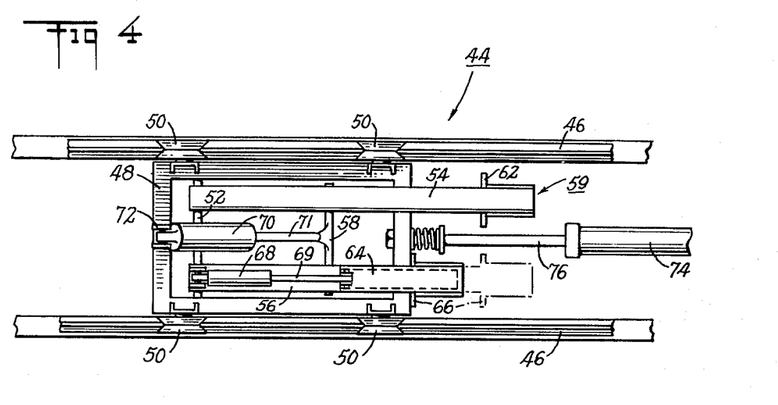
FIGURE 4 is a top plan view of the cart assembly illustrated in FIGURE 3.
Figure 5:
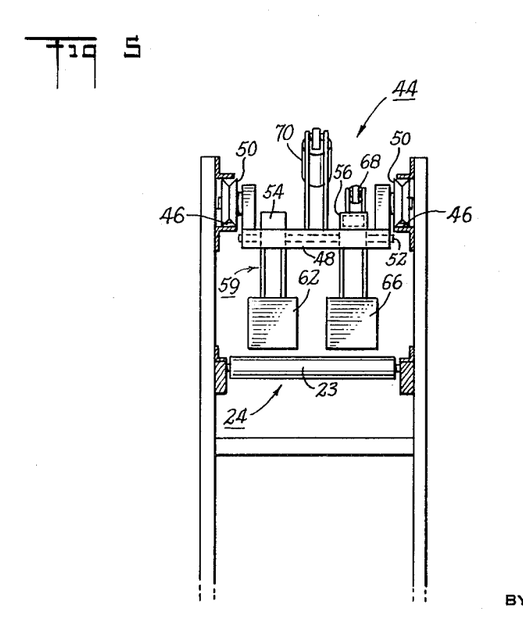
FIGURE 5 is a sectional end view of the cart and tracks illustrated in FIGURE 4, taken along line 5—5 in FIGURE 3.

In order to form the blocks 16 thus placed on marshalling conveyor 24 into appropriate modules to be handled by finger table 26, a suitable forming means is provided such as the forming cart 44 shown in FIGURES 3, 4 and 5. Cart 44 is supported on tracks 46 for movement parallel to the path of blocks 22 in marshalling conveyor section 24, with tracks 46 extending over the front of finger table 26.

Cart 44 comprises a rectangular frame assembly 48 having wheels 50 positioned on tracks 46. A transversely-extending shaft 52 is mounted to the front or left of cart assembly 44 as viewed in FIGURE 3. Rotatably mounted on shaft 52 are a pair of rearwardly extending arms 54 and 56, which are joined by a welded crossbar 58 to form a pivoted sub-frame 59. Arm 54 extends to the rear of main frame cross-member 60, and is supported thereon in its lowermost position. Near the extreme rear of arm 54 is mounted a depending block pusher 62. Arm 56 has near its rear end a sleeved movable extension 64 mounted on a reduced section thereof. Extension 64 carries a depending block pusher 66 similar to block pusher 62 thereon.

A hydraulic cylinder 68 is mounted on arm 56, and has its ram 69 attached to extension 64, whereby cylinder 68 may retract or extend extension 64 and pusher 66 to the position shown in dotted lines in FIGURES 4. For an 8 x 16 inch block, cylinder 68 preferably has an 8 inch stroke.

A further hydraulic cylinder 70 is mounted on an upwardly extending support member 72 at the front end of cart 44, and has its ram 71 attached to cross member 58. Cylinder 70 and ram 71 extend downwardly toward the rear of the cart, whereby when ram 71 is drawn into cylinder 70, the entire sub-frame assembly 59, including arms 54, 56, and pushers 62 and 66 may be pivoted upwardly sufficiently to clear blocks 16 to the position 70a shown in dotted lines at the upper right of FIGURE 3.

A large hydraulic cylinder 74 is mounted at a fixed point relative to rails 46 and has its ram 76 attached to the rear frame cross member 60 of cart 44. Cylinder 74 and ram 76 are arranged horizontally and parallel to the tracks 46 on which cart 44 runs, and accordingly, when ram 76 is extended cart 44 is propelled to the left as viewed in FIGURE 3. Hydraulic cylinder 74 is preferably of the type having a plurality of selectable strokes, such for example as the cylinder shown in United States Patent No. 2,968,284 to J. P. Ellis, Jr., for Electromechanical Control Device.

Accordingly, pusher 66 may be positioned even with or eight inches ahead of pusher 62 by means of cylinder 68, and the entire cart assembly may be driven to preselected positions over finger table 26, after gate 40 is lowered, with pushers 62 and 66 positioning the blocks 16 relative to each other to form modules, as illustrated in FIGURE 1.

After the blocks are thus positioned by cart assembly 44, piston 71 on cylinder 70 may be retracted, raising pushers 62 and 66 sufficiently to clear the incoming blocks 16 being assembled in marshalling area 24 until the cart 44 is returned to its original position shown in heavy lines in FIGURE 3. After the correct number of blocks have been assembled in marshalling area 24, ram 71 may be again extended, lowering the sub-frame 59 with pushers 62 and 66 being positioned to the right of the selected newly assembled set of blocks.

To form a pyramidal module, two blocks are fed by gate 32 to conveyor 24, and one block is fed by gate 34. Cart 44 is then propelled to the right with ram 69 retracted as viewed in FIGURE 3 in dotted lines, and ram 71 is extended to lower pushers 62 and 66 to the position shown in heavy lines in FIGURE 3. Ram 76 is then extended, propelling cart 44 to the left. Gate 40 is lowered simultaneously with the extension of ram 76.

In the exemplary system, as the cart 44 is propelled to the left, pushers 62 and 66 will engage and propel the selected blocks onto finger table 26, and block 19 will be positioned in alignment with the juncture of blocks 18 since pusher 66 is offset with respect to pusher 62 by the width of one block, i.e., 8 inches. Thus, when piston-ram 76 is extended, blocks 18 and 19 are formed into a pyramidal module as shown in FIGURE 1, and are later ally located on finger table 28 at a position determined by the stroke of piston-ram 76.

To form a linear module, three blocks may be admitted by gate 34, cart 44 returned with sub-frame 59 raised and piston 69 extended, and piston 71 extended to lower pusher 66 behind the three blocks. Ram 76 is then extended, propelling cart 44 and the three blocks in a linear module onto finger table 26.

The finger table

Figures 7, 8:
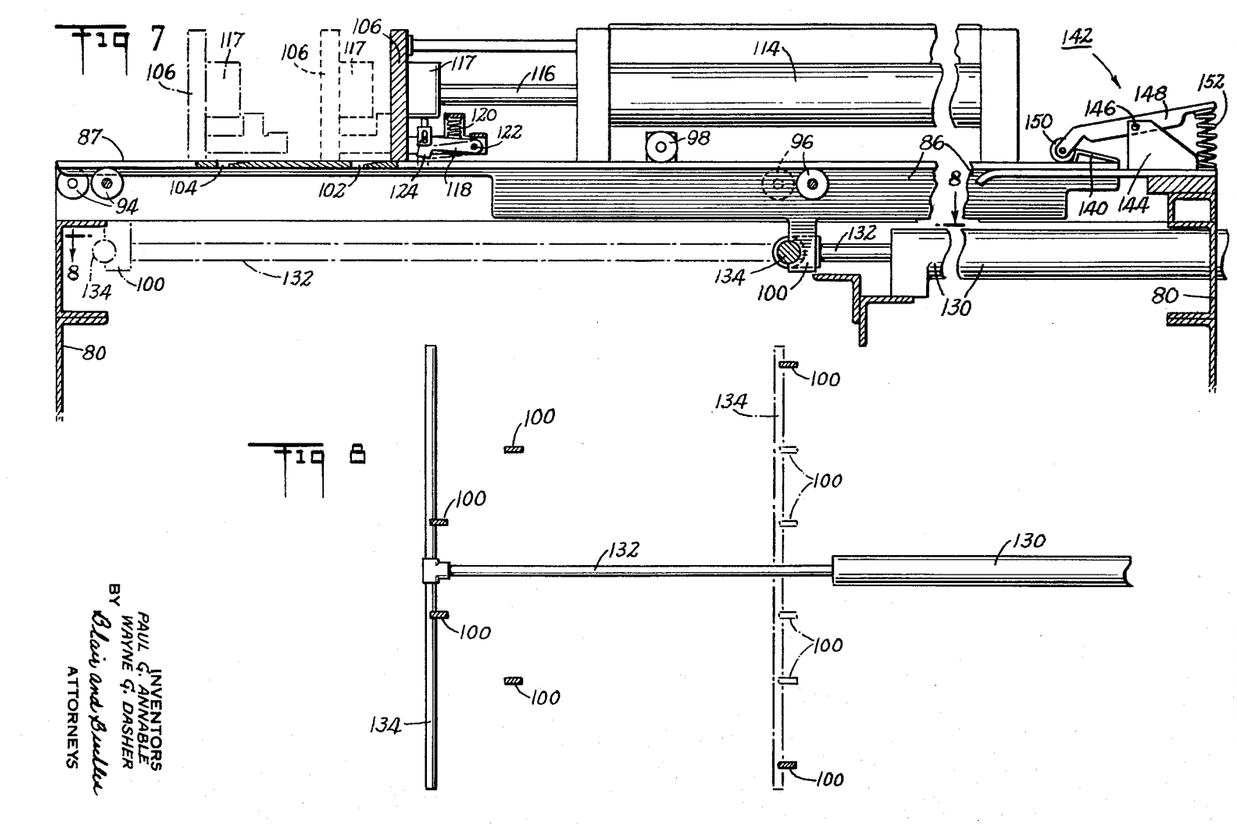
FIGURE 7 is a sectional side view of the table assembly, taken along line 7—7 of FIGURE 6.
FIGURE 8 is a sectional view taken along line 8—8 in FIGURE 7, FIGURES 9–12 are active plan views illustrating the several steps in the sequence of forming a rectangular array.

Referring now to FIGURE 6, there is shown in greater detail the finger table assembly 26, which is here illustrated as suitable for 8" by 16" concrete blocks. Table assembly 26 generally comprises a frame 80 having mounted thereon a plurality of slidable fingers 82, 84, 86, 88, 90 and 92, the upper surfaces of which are horizontally aligned with conveyor 24 as shown in FIGURE 3. Adjacent fingers have their center lines laterally spaced the width of a block (8") and each has an upper block-supporting surface 3" wide, except the wider fingers 86 and 88, which are equally spaced on either side of the center line of table assembly 26. Fingers 86 and 88 have block-supporting upper surfaces 87 and 89, respectively, which are 6" wide. Surfaces 87 and 89 are centered above the inner edges of the fingers, to provide in effect inwardly oriented 3" extensions of the normal 3" upper surfaces. As shown in FIGURES 6 and 7, each of the fingers is an elongated wide-flanged member having a deep T-shaped cross-section over most of its length and a much shallower T-shaped cross-section near its front end. This permits the supporting surfaces to be near the upper surface of turn-table 26 or tiers of blocks supported thereon when the fingers are extended, thus reducing the distance the modules will be dropped when the fingers are retracted, while providing ample clearance between the fingers and the turntable.

Referring to FIGURE 7, each finger is suitably supported as by rollers 94 and 96 mounted in frame 80 beneath the horizontal section or flange of each finger, together with further rollers 98 mounted on frame 80 to engage the upper surface of each finger flange. Accordingly, each finger is mounted and supported for motion parallel to its longitudinal axis from the reset position illustrated in FIGURE 6 to extended positions overlying turntable 28, as indicated by dot-dashed lines in FIGURE 2.

Each finger is provided with a rigid central downwardly extending member 100, shown in FIGURE 7, the function of which will be explained below. Each finger likewise has on its upper surface a first recess 102 shown in FIGURE 6 and positioned slightly less than the width of two blocks from its front end (approximately 14") and a second recess 104 positioned the width of one block nearer the front end of its finger than recess 102.

Positioned above the fingers is a vertically oriented pusher plate 106, which extends across the finger-table at right angles to the axes of the fingers. Pusher plate 106 is mounted on a pair of parallel, horizontally disposed support members 108, which in turn are mounted for movement parallel to the axes of the fingers, being supported by rollers 110 and 112. A large hydraulic pusher cylinder 114 is mounted on chassis 80, and has its ram 116 secured to the back surface of pusher plate 106. Accordingly, as ram 116 is extended, pusher plate 106 moves from the reset position illustrated in FIGURE 6, to extend over the turntable assembly 28 as shown in dot-dash lines in FIGURE 2, with pusher plate 106 being supported by members 108 in rollers 110 and 112. Cylinder 114 is constructed and arranged so as to selectively extend pusher plate 106 to one of a plurality of preselected extended positions, and to retract plate 106 to the reset position. Pusher cylinder 114, similar to cart-pushing cylinder 74, may be generally of the type shown in the Ellis patent, above identified.

Referring now to FIGURE 7, a small vertical hydraulic cylinder 117 is mounted on the rear surface of pusher plate 106 above each finger, and is arranged to raise a dog 118 against the urging of a spring 120 from the surface of the corresponding finger. Each dog 118 is aligned with the pair of recesses 102 and 104 on its corresponding finger, and is pivotally mounted on a transverse shaft 122. When any cylinder 117 is actuated, its corresponding dog 118 is urged by spring 120 into contact with the upper surface of the corresponding finger for engagement with one of the recesses 102 or 104 when pusher 106 is extended, thus driving the corresponding finger with the pusher 106. By individually controlling cylinders 117, selected fingers may be thus engaged and driven with their forward edges at either of two distances from pusher 106, or may remain in the reset position. Accordingly, cylinders 117, dogs 118 and recesses 102 and 104 constitute clutch assemblies for engaging and driving selected fingers at either of two positions relative to pusher 106 during extension of pusher 106.

The fingers thus extended may be returned to the reset position independently of pusher plate 106, after withdrawal of dogs 118 by cylinders 117, by the mechanism illustrated in FIGURES 7 and 8. A hydraulic cylinder 130 is fixed to frame 80 below and parallel to the fingers, and bears rigidly mounted on its piston 132 a cross shaft 134 which extends transversely across the fingertable. When one or more fingers are extended as above described, the downwardly extending members 100 projecting beneath the fingers thus extended engage cross shaft 134, and accordingly, piston 132 is drawn to its extended position as shown in FIGURE 8. When dogs 118 are withdrawn, thus freeing the fingers for withdrawal to the reset position, the fingers are reset by retraction of piston 132. Cross shaft 134 engages the depending members 100 on each of the fingers which have been extended from the reset position, and returns them to the reset position as shown in dotted lines in FIGURE 8.

An inclined ramp 140 is mounted on the rear of each finger, and in cooperation with a roller assembly 142, provides a mechanism for retaining each finger in its reset position until positively overridden by engagement of dog 118 with a recess 102 or 104. Assembly 142 generally comprises an upstanding frame 144 bearing a pivot pin 146. A lever 148 is pivoted on pin 146 near its center, and carries a roller 150 mounted on its forward end. Roller 150 is urged downwardly by a compression spring 152 mounted between a plate 154 on frame 80 and the rear end on the lever 148. By suitably selecting or adjusting the resilience of spring 152, the position of the pivot point of lever 148, and the front slope of ramp 140, the associated finger may be retained in its restored position until a suitable threshold force is applied, at which time roller 150 rides up the forward incline surface of ramp 140 as the associated finger moves forward. When the associated finger is restored by cylinder 130 as above described, roller 150 rides up the rear surface of ramp 140, compressing spring 152, until it reaches the forward surface of ramp 140, whereupon roller 150 rides down the forward surface until it rests on the upper surface of the associated finger, thus locking the finger into the restored position.

The turntable assembly

Referring to FIGURE 3, the turntable assembly 28 generally comprises a platform 170 pivotally mounted on a vertical hydraulic ram 172 by a rotatable mounting 174, with its center of rotation aligned with the centerline of finger table 26. A motor 176 for rotating platform 170 is rigidly mounted on ram 172 and drives a spur gear 178 by its pinion 180. Platform 170 comprises a plurality of rollers 182 mounted in a suitable frame 184, which are covered by a continuous belt 186. A portion of belt 186 is engaged by drive roller 188, which in turn is driven by motor 190 by means of chain belt 192 and sprockets 194 and 195. As illustrated, sprockets 194 and 195 are keyed to drive roller 188 and the shaft of motor 190 respectively, while motor 190 is mounted on frame 184.

The turntable assembly may be rotated about piston 172 by operating motor 176, thus driving spur gear 178 by means of pinion 180. After each layer or tier of blocks has been placed on the turntable assembly, ram 172 is lowered the thickness of the layer, whereby the top surface of the last complete layer on the turntable is slightly below the level of the fingers 82–92. After a complete stack has thus been constructed, motor 180 may be energized, thus driving belt 186 and transporting the entire cube from turntable assembly 170 to a suitable receiving means, such as a further conveyor line.

Formation of a rectangular array

Figure 9:
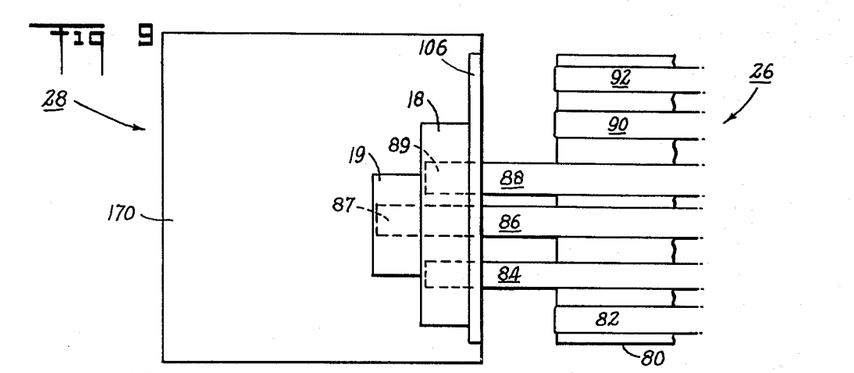

Referring now to FIGURES 9–12, the sequence of operations for forming a rectangular array will be explained. As shown in FIGURE 9, a first pyramidal module is formed by cart 44 and placed on finger table 26 with apex block 19 centered on surface 87 of finger 86. Piston 116 of hydraulic cylinder 114 is then extended, and dog 118 above finger 86 is lowered into contact with the upper surface of finger 86 before pusher plate 106 passes recess 102 on finger 86, thus picking up and driving finger 86. As pusher plate 106 continues to be extended, the appropriate cylinders 116 are then operated in time for their respective dogs 118 to engage recesses 104 on fingers 84 and 88, thus driving fingers 84 and 88 to a distance approximately 8 inches less than finger 86 is driven. As may be seen in FIGURE 9, fingers 84, 86, and 88 thus conform in plan view to the pyramidal outline of the first module.

Piston 116 continues to extend until the leading edge of apex block 19 is eight inches from the center of rotation of turntable 170. At this time, cylinders 117 are actuated, withdrawing dogs 118 from the recesses in fingers 84, 86, and 88. Cylinder 132 is then actuated, withdrawing cross-shaft 134 and by engagement of shaft 134 with depending members 100, rapidly stripping back fingers 84, 86, and 88. Since pusher plate 106 is maintained in its extended position at this time, the first module drops directly downward onto turntable 170. Pusher plate 106 is then retracted in preparation for the second module. Turntable 28 is then rotated 90° counterclockwise.

Figure 10:
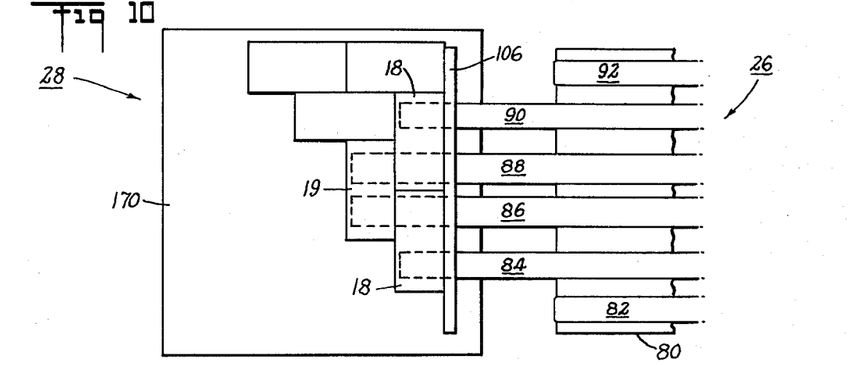
Figure 11:
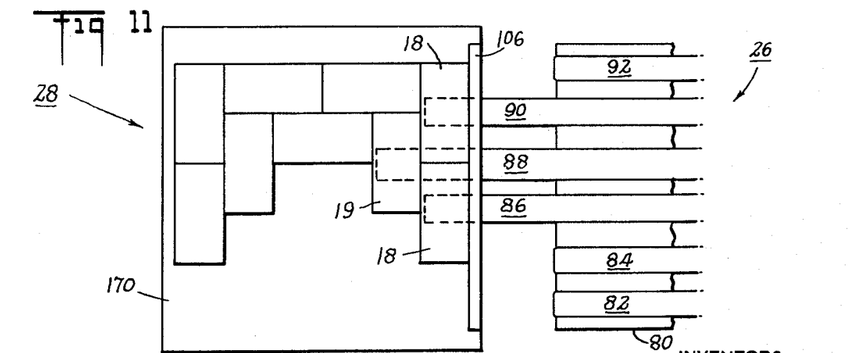

As shown in FIGURE 10, the second module is formed and placed on finger table 26 with its apex block aligned with the center line of the finger table. Pusher plate 106 is then extended by piston 116, and dogs 118 mounted thereon are operated to engage recesses 102 in fingers 86 and 88, and to then engage recesses 104 in fingers 84 and 90.

Fingers 84, 86, 88, and 90 thus conform to the outline of the second pyramidal module, whereby the fingers do not interfere with the previously positioned first module in the process of placing the second module. It is noted that pusher 106 is extended by one-half the width of a single block (about 4 inches) further when placing the second module than when placing the first module. Accordingly, the upper corner of block 18 is fitted into the right step on the first module with the apex block of the first module fitted into the upper step of the second module, as viewed in FIGURE 10. At this point, dogs 118 are again withdrawn by corresponding cylinders 117, and the extended fingers are rapidly stripped back by operation of cylinder 130. The second module of blocks drops directly down on the turntable 170, falling approximately one inch. Pusher plate 106 is then retracted by cylinder 114 in preparation for the third pyramidal module, and turntable assembly 28 is again rotated counterclockwise by 90°.

A third pyramidal module is formed and placed by cart 44 with its apex block centered on finger 88. Pusher plate 106 is then extended, and dogs 118 are operated so as to engage recess 102 on finger 88 and recesses 104 on fingers 86 and 90. The stroke of piston 114 is the same as described above with reference to FIGURE 9, and extends the selected fingers and the third module until the apex block of the third module interfits in the right step of the second module as viewed in FIGURE 11, with block 17 of the second module interfitting in the upper step of the third module. As before, dogs 118 are then withdrawn, the fingers are stripped back to the reset position, thus dropping the third module in place, and pusher plate 106 is returned to the reset position in preparation for the fourth pyramidal module.

Figure 12:
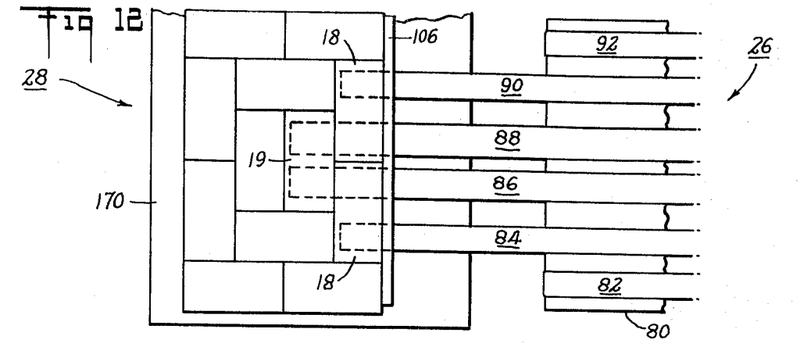

Turntable assembly 28 is then rotated 90° counterclockwise. Cart 44 then places the fourth pyramidal module on the finger table 26, with the apex block thereof aligned with the center line of the table, as shown in FIGURE 12. Fingers 84, 86, 88, and 90 are then picked up and extended with the fourth module, exactly as described above with respect to the second module, except that the stroke of cylinder 114 is adjusted so that the fourth module is placed 8 inches further from the finger table assembly than the second module. This places the fourth module with its apex block centered on the center of rotation of turntable 26, abutting the apex block of the second module with the upper step of the fourth module interfitting with the right step of the third module, and the lower step of the fourth module interfitting with the right step of the first module, as viewed in FIGURE 12. As before, dogs 118 are withdrawn, the several fingers are stripped back to the restored position, and pusher plate 106 is stripped back to the restored position. The resulting configuration of four pyramidal modules, thus interfitted, is termed a rectangular array. This basic building unit is utilized, in combination with linear arrays, to form a complete layer as will be discussed with reference to FIGURES 13 and 14.

Thus, the outline in plan view of the fingers which are extended in placing the several pyramidal modules in place, are so controlled as to conform to the plan view of the outline and positioning of the pyramidal module being placed, whereby in the placing of any particular pyramidal module, no finger can contact any previously placed module.

*Layer formation*

Figure 13:
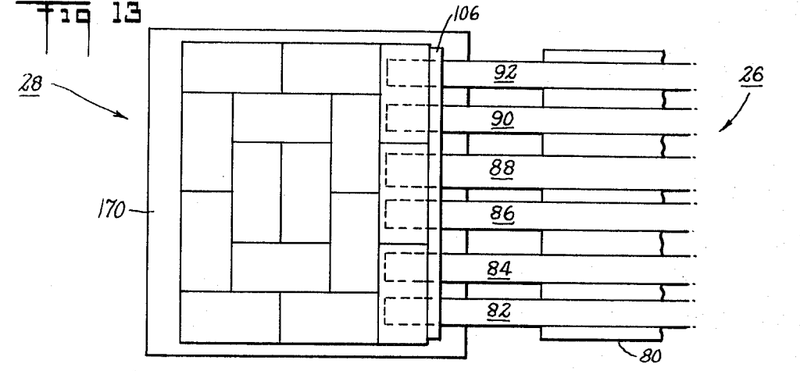
FIGURE 13 is an active plan view showing addition of a linear module to a rectangular array, thus completing one form of a layer

The basic rectangular array as shown in FIGURE 12 may then be made into a complete layer by the addition thereto of a linear array as shown in FIGURE 13. The long vertical side of the linear array shown in FIGURE 12, is three blocks long (approximately 48 inches for the exemplary concrete blocks). First, a linear module of three blocks is placed on finger table 26. Pusher plate 106 is then extended, with dogs 118 engaging recesses 104 on each of the fingers, and thus the fingers conform to the plan view of the linear module. Pusher plate 106 and all fingers are then extended until the linear module is positioned adjacent the long vertical side of the rectangular array, which is also three blocks long as shown in FIGURE 13. Dogs 118 are then released, the fingers are stripped back to the restored position, and pusher plate 106 is then restored.

This completes one layer of the cube. In order to form the next layer, the entire turntable assembly is lowered the thickness of one block by lowering piston 172 (FIGURE 3, and is also rotated 90° clockwise by operation of motor 176. The next layer is then assembled thereon, following the identical steps as are shown in FIGURES 9–13, resulting in adjacent layers being rotated 180° with respect to each other.

Figure 14:
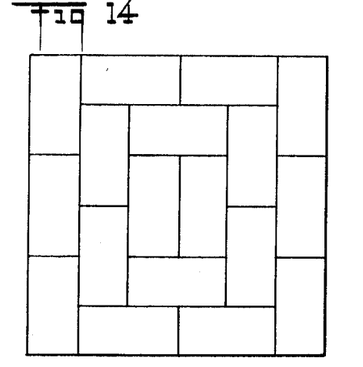
FIGURES 14 and 15 are plan views illustrating further alternative constructions of one layer.

Alternative to the finished layer illustrated in FIGURE 13, a larger layer may be constructed by rotating the configuration of FIGURE 13 by 180° and adding thereto a further linear array to complete a square layer, as shown in FIGURE 14. When this is done, the turntable is lowered but not rotated before beginning to form the next layer, resulting in adjacent layers being rotated 90° with respect to each other.

While the invention has been described above with respect to 8 x 16 inch blocks, it is applicable to other rectangular prisms having an upper surface wherein the length is approximately twice as large as the width, by merely changing the scale of the apparatus. The specific described apparatus can readily handle 8" x 18" blocks by minor adjustments of the strokes of the various cylinders, and the resulting stack is well interlocked even though there are some spaces left between individual modules.

Figure 15:
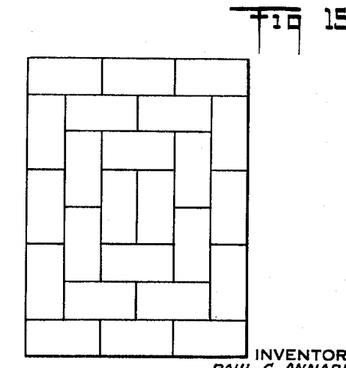

The invention is equally applicable to basic pyramidal modules containing more than three blocks. Thus FIGURE 15 shows a rectangular array formed of four pyramidal six-block modules, each of which has an altitude corresponding to the width of three blocks, and a base corresponding to the length of three blocks. This rectangular array of FIGURE 15 may be made into a layer by adding a linear module of four blocks adjacent one long side thereof, analogous to FIGURE 13, in which case the completed layer would be rotated 90° clockwise prior to formation of the next layer. Likewise, one such linear module may be added to each long side of the FIGURE 15 rectangular array to form a complete square layer, analogous to FIGURE 14, in which case the completed layer is not rotated prior to formation of the next layer. When forming pyramidal modules having altitudes of $n$ blocks, $n$ rows of blocks are preferably used to supply the forming area. Likewise, $n$ extended relative positions should be provided for the several fingers, as by providing $n$ recesses such as 102 and 104, and $2n$ fingers may be provided.

As an aid to handling the stack, the lowermost layer may be formed by placing five linear modules side-by-side in the case of the FIGURE 13 layer, or six such modules in the case of the FIGURE 14 layer. When "hollow" concrete blocks are used, the resulting lower layer has the apertures in the blocks aligned, and thus may be used as a pallet, with the tines of a fork-lift truck passing through the aligned apertures. The motor 190 may be replaced by a suitable stack pusher for pushing a completed stack off platform 172.

While the various motion-producing elements have been described as hydraulic cylinders, other equivalent means could be substituted therefor, for example, pneumatic cylinders, solenoids, rotary motors with rack-and-pinion drive, etc. It is further contemplated that two or more finger-tables may be provided for cooperatively supplying a single turntable.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. In apparatus for handling and stacking modules of blocks a module-handling apparatus at one station for placing modules at another station, comprising in combination,
 (a) a plurality of parallel elongated support fingers arranged in a horizontal plane,
 (b) first mounting means supporting said fingers for independent reciprocable motion from a restored position to a plurality of extended positions in a first direction in said plane,
 (c) a pusher member transverse to and overlying said fingers in a restored position,
 (d) second mounting means supporting said pusher member for reciprocable motion from its restored position to a plurality of extended positions in said first direction,
(e) reversible pusher control means for extending said pusher member,
(f) and finger control means for extending selected fingers individually selectable distances in said first direction when said pusher member is extended.

2. The combination of claim 1, wherein said finger control means comprises a plurality of independently operable clutching means mounted on said pusher member for selectively engaging and driving corresponding fingers at selected points during the movement of said pusher member in said first direction.

3. The combination of claim 2 further including restoring means for resetting said fingers to the restored position.

4. The combination of claim 1, further comprising a finger restraining means releasably engaged with each finger when in the restored position for preventing movement of the corresponding finger in said first direction before said finger is engaged by said clutching means.

5. In apparatus for handling and transporting blocks, the combination comprising,
(a) means for forming blocks into pyramidal block modules,
 (1) including gate means for sequentially feeding groups of blocks for formation into pyramidal block modules.
(b) a finger table supporting a plurality of parallel fingers,
 (1) means for independently positioning said fingers at predetermined positions with respect to one another for receiving and supporting said block modules,
 (2) means for horizontally extending and retracting said fingers,
(c) a pusher member transversely overlying said fingers,
 (1) said pusher member being extendably positionable with respect to said fingers, and
(d) turntable means adjacent said finger table for receiving block modules in a predetermined sequence to form stacked block arrays,
whereby formed block modules are supported and transported over said turntable means by said fingers, said fingers being withdrawn under said pusher member to deposit each block module on said turntable means.

References Cited by the Examiner
UNITED STATES PATENTS

| | | |
|---|---|---|
| 2,630,214 | 3/1953 | Reed. |
| 2,655,271 | 10/1953 | Cole et al. |
| 2,675,928 | 4/1954 | Slater. |
| 2,768,756 | 10/1956 | Horman _________ 214—514 X |
| 2,769,558 | 11/1956 | Ehlers. |
| 2,813,617 | 11/1957 | Sheetz _____________ 198—30 |
| 2,818,156 | 12/1957 | Edwards. |
| 2,831,564 | 4/1958 | Pavesi _____________ 198—30 |
| 2,883,074 | 4/1959 | Boehl. |
| 2,901,128 | 8/1959 | Barski. |
| 2,958,436 | 11/1960 | Skutle ____________ 214—731 |
| 2,985,328 | 5/1961 | Fitch _____________ 214—731 |
| 3,070,206 | 12/1962 | McElhany __________ 198—24 |
| 3,126,086 | 3/1964 | Holben ____________ 198—24 |

GERALD M. FORLENZA, *Primary Examiner.*

HUGO O. SCHULZ, MORRIS TEMIN, *Examiners.*

M. WOLSON, *Assistant Examiner.*